(12) United States Patent
Pflüger et al.

(10) Patent No.: US 12,442,678 B2
(45) Date of Patent: Oct. 14, 2025

(54) HIGH-FREQUENCY-BASED FIELD DEVICE

(71) Applicant: Endress+Hauser Flowtec AG, Reinach (CH)

(72) Inventors: Stefan Pflüger, Munich (DE); Christian Wegner, Schwörstadt (DE)

(73) Assignee: Endress+Hauser Flowtec AG, Reinach (CH)

( * ) Notice: Subject to any disclaimer, the term of this patent is extended or adjusted under 35 U.S.C. 154(b) by 372 days.

(21) Appl. No.: 18/257,758

(22) PCT Filed: Nov. 26, 2021

(86) PCT No.: PCT/EP2021/083102
§ 371 (c)(1),
(2) Date: Jun. 15, 2023

(87) PCT Pub. No.: WO2022/128403
PCT Pub. Date: Jun. 23, 2022

(65) Prior Publication Data
US 2024/0118123 A1    Apr. 11, 2024

(30) Foreign Application Priority Data
Dec. 17, 2020   (DE) ............... 10 2020 134 061.3

(51) Int. Cl.
*G01F 23/284*   (2006.01)
*G01S 13/88*    (2006.01)
*H01Q 1/22*     (2006.01)

(52) U.S. Cl.
CPC ......... *G01F 23/284* (2013.01); *G01S 13/88* (2013.01); *H01Q 1/225* (2013.01)

(58) Field of Classification Search
CPC ........ G01F 23/284; G01S 13/88; H01Q 1/225
See application file for complete search history.

(56) References Cited

U.S. PATENT DOCUMENTS 10,260,930 B2    4/2019  Trottier
2007/0297523 A1* 12/2007 Cattaneo ............. H04L 27/2626
                                                          375/260

(Continued)

FOREIGN PATENT DOCUMENTS

DE      19926787 A1     1/2001
DE    102014107249 A1  11/2015
EP       3327429 A1     5/2018

*Primary Examiner* — Bernarr E Gregory
*Assistant Examiner* — Ismaaeel A. Siddiquee
(74) *Attorney, Agent, or Firm* — Mark A. Logan; Endress+Hauser (USA) Holding, Inc.

(57) ABSTRACT

For calibrating high frequency based field devices, a first switching unit is provided between the antenna arrangement and the transmission amplifier and receiving amplifier of the field device. For ascertaining the corresponding calibration factors, the first switching unit can assume switch positions at which the signal production unit and/or the evaluation unit are/is connected with the antenna arrangement, and at which the transmission path and/or the receiving path are/is connected with an attenuation element via which the transmission path is connectable with the receiving path. An evaluation unit of the field device ascertains at least at these switch positions the corresponding characteristic variable to use these in the later measurement operation as calibration factors. Advantageous with this kind of calibration of the invention is that possible couplings of the amplifiers are compensable.

13 Claims, 3 Drawing Sheets

(56) References Cited

U.S. PATENT DOCUMENTS

| | | | |
|---|---|---|---|
| 2015/0256272 A1* | 9/2015 | Weissman | H03F 3/213 455/84 |
| 2017/0163295 A1* | 6/2017 | Talty | H03F 3/24 |

* cited by examiner

| | # | Second switching unit 18 | | First switching unit 17 | |
|---|---|---|---|---|---|
| | | @ 13 | @ 15 | @ 13 | @ 15 |
| Determining ($\hat{s}_{i,j}'$) | 1 | SHORT | SHORT | LOAD | LOAD |
| | 2 | LOAD' | LOAD' | LOAD | LOAD |
| | 3 | GND' | GND' | LOAD | LOAD |
| | 4 | LOAD' | GND' | LOAD | LOAD |
| | 5 | GND' | LOAD' | LOAD | LOAD |
| Determining ($\hat{s}_{i,j}$) | 6 | THRU' | THRU' | -60dB | -60dB |
| | 7 | THRU' | THRU' | THRU | -60dB (LOAD) |
| Measuring | 8 | THRU' | THRU' | THRU | THRU |

Fig. 3

HIGH-FREQUENCY-BASED FIELD DEVICE

CROSS-REFERENCE TO RELATED APPLICATIONS

The present application is related to and claims the priority benefit of DPMA Patent Application No. 10 2020 134 061.3, filed on Dec. 17, 2020, and International Patent Application No. PCT/EP2021/083102, filed Nov. 26, 2021, the entire contents of which are incorporated herein by reference.

TECHNICAL FIELD

The present disclosure relates to calibrating a high frequency based field device.

BACKGROUND

In automation technology, especially for process automation, field devices are often applied, which serve for registering diverse measured variables. The measured variable to be determined can be, for example, a fill level, a flow, a pressure, the temperature, the pH value, the redox potential, a conductivity or the dielectric value of a medium in a process plant. Field devices have sensors suitable for registering the desired measured variables and based on suitable measuring methods. A large number of different field device types are manufactured and sold by the Endress+Hauser group of companies.

For fill level measurement of fill substances in containers, radar based measuring methods have proven themselves, since they are robust and require low-maintenance. A central advantage of radar based measuring methods is their ability to measure fill level virtually continuously. In the context of the present disclosure, the terms radar, and high frequency refer to corresponding signals with frequencies between 0.03 GHz and 300 GHz. Usual frequency bands, at which fill level measurement is performed, lie at 2 GHz, 26 GHz, 79 GHz, and 120 GHz. Measuring principles used for fill level measurement are the pulse travel time principle (also known as pulse radar]) and the Frequency Modulated Continuous Wave (FMCW) principle. In the case of both measuring principles, a high frequency signal is transmitted to the medium and a signal travel time of the high frequency signal until receipt of its reflection on the surface of the medium is ascertained. From the signal travel time, in turn, the separation from the fill substance can be calculated, and, from that, the fill level. A fill level measuring device, which works according to the pulse travel time method is described, for example, in disclosure document DE 10 2012 104 858 A1. An example of typical construction of FMCW based fill level measuring devices is shown in disclosure document DE 10 2013 108 490 A1. Further description of the measuring principles, FMCW and pulse radar, is provided, moreover, by *Radar Level Detection*, Peter Devine, 2000.

From the dielectric value (also known as "dielectric constant" or "relative permittivity"), diverse measured variables of a medium can be derived, such as, for example, moisture content, substance composition or possible impurities. Therefore, the determining of the dielectric value is of great interest both in the case of bulk media, such as cement or feed or food grain, as well as also in the case of liquid and gaseous media, such as, for example, in the case of fuels, waste waters, gases or chemicals. In such case, the dielectric value can be determined, in principle, both in the case of stored media as well as also in the case of flowing media. Accordingly, the term container in the context of the present disclosure includes, for example, a tank, silo, basin or pipeline section.

Besides the inductive- and capacitive measuring principles for determining the dielectric value, analogously to fill level measurement, also high frequency based measuring principles can be applied. In such case, besides the Time Domain Reflectometry (TDR) principle, it is possible to determine the dielectric value by means of transmissive high frequency measuring. In the case of this measuring principle, within the container containing the medium being investigated, a high frequency signal having at least one defined frequency, or frequency change, is in-coupled into a measurement path, which leads through the medium. In such case, after passing through the measurement path, an amplitude/amplitude change, and/or a phase/phase shift is measured, in order, for example based on corresponding calibration measurements, to determine the dielectric value. Further details concerning a transmission based dielectric value measuring device are contained, for example, in the German publication DE 10 2017 130 728 A1.

Both in the case of radar based fill level measurement, as well as also in the case of transmission based dielectric value measurement, the high frequency signal is burdened in passage through the measurement path by a high signal attenuation, above all, in the case of highly aqueous media and at large measured separations. Accordingly, as a rule, a transmission amplifier is placed after the signal production unit for producing the high frequency signal to be transmitted, or a receiving amplifier is placed in front of the evaluation unit for the better processing of the received high frequency signal. Unfortunately, these amplifier-steps introduce unavoidable problems. Examples are couplings between the transmitting- and receiving paths as well as undesired reflections. Due to the high level-differences between the output of the transmission amplifier and the input of the receiving amplifier, in the case of compact construction, coupling is unavoidable, which additively superimposes on the received high frequency signal.

Conventional calibration methods, such as, for example, the LMR16-method or the SHORT, OPEN, LOAD, THRU (SOLT)-method do not help in this regard, since signal-amplification couplings are not compensated by means of these calibration methods. Rather, the coupling related errors in the calibration factors of these calibration methods are multiplied. Further details for the LTC16 method are contained, for example, in *LMR16—A Self Calibration Procedure for a Leaky Network Analyzer*, K. Silvonen, IEEE TRANSACTIONS ON MICROWAVE THEORY AND TECHNIQUES, VOL. 7, JULY 1997. The SOLT method is described in, among others, *An Explicit Solution for the Scattering Parameters of a Linear Two-Port Measured with an Imperfect Test Set (Correspondence)*, W. Kruppa and K. F. Sodomsky, IEEE TRANSACTIONS ON MICROWAVE THEORY AND TECHNIQUES, JAN. 1971, VOL. 19, NO. 1, pp. 122-123.

SUMMARY

An object of the present disclosure is, therefore, to provide a high frequency based field device, whose measured value is not corrupted as a result of internal signal amplification.

The present disclosure achieves this object by a high frequency based field device for determining a measured variable of a medium, especially a fill level or a dielectric value of the medium. For this, the field device includes components as follows:

An antenna arrangement placeable on a container for
transmitting a high frequency signal to the medium, and
after interaction with the medium, receiving a received signal,
a signal production unit, which is designed to produce the high frequency signal to be transmitted and to supply such via a transmission path to the antenna arrangement,
an evaluation unit, which is connected via a receiving path with the antenna arrangement, in order to determine a defined characteristic variable at least based on an incoming, received signal,
a transmission amplifier arranged in the transmission path and/or a receiving amplifier arranged in the receiving path,
a first switching unit, which is arranged between the antenna arrangement and the transmission amplifier in the transmission path, and the receiving amplifier in the receiving path. In such case, the first switching unit is designed to assume such switch positions (i, j=THRU, ATN, GND, LOAD, OPEN) that,
the signal production unit and/or the evaluation unit are/is connected, in each case, with the antenna arrangement (i, j=THRU), and
the transmission path and/or the receiving path are/is connected to an attenuation element, via which the transmission path is connectable with the receiving path, wherein the antenna arrangement in the case of this switch position is separated from the signal production unit and/or from the evaluation unit (i, j=ATN).

In the context of the present disclosure, the terminology, interaction, in the case of fill level measurement refers to reflection of the high frequency signal on the fill substance surface. In the case of dielectric value measurement, it refers to irradiating the medium on a defined measurement path, thus, between the transmitting antenna and the receiving antenna. Analogously thereto, the terminology, measurement path, in the case of fill level measurement refers to the intermediate space between fill level measuring device and fill substance surface.

The evaluation unit is designed according to the present disclosure to,
set the switch position (i, j=THRU, ATN, GND, LOAD, OPEN) of the first switching unit,
define at at least one of the switch positions (i, j=THRU, ATN, GND, LOAD, OPEN) the corresponding characteristic variable ($s_{i,j}$) as a first calibration factor ($\hat{s}_{i,j}$),
to reconcile the characteristic variables ($s_{i,j}$) ascertained in measurement operation by means of at least the one, first calibration factor ($\hat{s}_{i,j}$), and
to determine the measured variable of the medium based on the reconciled characteristic variable ($s'_{i,j}$).

The central advantage of this type of reconciliation of the present disclosure is that possible couplings of the amplifiers are compensated thereby.

The terminology, unit, in the context of the present disclosure, means, in principle, any electronic circuit, which is suitably designed for the contemplated application. It can, thus, depending on requirement, be an analog circuit for producing, or processing, corresponding analog signals. It can even be a digital circuit such, as an FPGA, or a storage medium in cooperation with a program. In such case, the program is designed to perform corresponding method steps, or to apply the needed computer operations of the unit. In this context, different electronic units of the field device can, within the scope of the present disclosure, potentially also use a shared physical memory, or be operated by means of the same physical, digital circuit.

The type of characteristic variable ($s_{i,j}$) depends on the type of measured variable to be determined. Depending on type of measured variable, the evaluation unit must be designed to determine as characteristic variable ($s_{i,j}$) of the received signal, for example, a phase, or phase shift, an amplitude, or amplitude change, and/or a signal travel time. Also, the design of the antenna arrangement is not fixedly prescribed as regards the field device of the present disclosure. Such depends, among other things, on the type of measured variable to be determined. In the case of transmissive dielectric value measurement, the antenna arrangement advantageously comprises a transmitting antenna for transmitting the high frequency signal and a separate receiving antenna for receiving the high frequency signal after its having passed through the medium. In the case of fill level measurement, it is usual that the antenna arrangement comprises a combined transmitting/receiving antenna for transmitting and/or receiving the high frequency signal.

The switch position (i, j=ATN), in which the high frequency signal is led through the attenuation element, corresponds in the case of calibration methods of the state of the art to a direct electrical connection between the transmission path and the receiving path. Accordingly, it is, within the scope of the present disclosure, advantageous, to size the attenuation element in such a manner that the produced high frequency signal, in signal direction, behind the transmission amplifier, or before the receiving amplifier, experiences an attenuation, which compensates the amplification factor of the transmission amplifier and/or the receiving amplifier.

In order that the calibration of the present disclosure can be expanded, for example, by a SOLT-calibration, the first switching unit can be designed, supplementally, to assume a switch position (i, j=LOAD), such that the transmission path outgoing from the signal production unit and/or the receiving path incoming to the evaluation unit, in each case, are/is connected via a load resistance to ground. In such case, it is for optional integration of a variant of the SOLT method, moreover, required to enable the first switching unit to assume a switch position (i, j=GND), such that the transmission path outgoing from the signal production unit and/or the receiving path incoming to the evaluation unit, are/is connected to ground, wherein the antenna arrangement in the case of this switch position (i, j=GND) is separated from the signal production unit and/or from the evaluation unit. Moreover, the first switching unit must in the case of a supplementing SOLT calibration be able to assume a switch position (i, j=OPEN), such that the transmission path and/or the receiving path are/is completely interrupted.

Corresponding to the field device of the present disclosure according to one of the above described embodiments, the object of the present disclosure is, moreover, achieved by a corresponding method for the calibration of the field device. Accordingly, the method has at least method steps as follows:
Switching the first switching unit at least to that switch position (i, j=ATN), at which
the transmission path is connected via the attenuation element with the receiving path and the antenna arrangement is separated from the signal production unit and/or from the evaluation unit,
producing the high frequency signal, ascertaining the characteristic variable ($s_{i,j}$) based on the received signal at the current switch position (i, j=ATN), and determining the at least one ascertained characteristic variable ($s_{i,j}$) as a first calibration factor ($\hat{s}_{i,j}$).

Advantageously in the context of the present disclosure, the first switching unit for determining the corresponding first calibration factor ($s_{i,j}$) also is switched to that switch position (i=THRU, j=ATN), in the case of which the signal production unit is connected with the antenna arrangement (i=THRU) and the receiving path is connected to the attenuation element (j=ATN), or in the case of which the transmission path is connected to the attenuation element (i=ATN) and the evaluation unit is connected with the antenna arrangement.

In such case, the characteristic variable ($s_{THRU,THRU}$) ascertained in measurement operation can be very exactly reconciled according to $$s'_{THRU,THRU} = \frac{s_{THRU,THRU} - \hat{s}_{THRU,ATN}}{\hat{s}_{-ATN,ATN} - \hat{s}_{THRU,ATN}}$$

and/or according to $$s'_{THRU,THRU} = \frac{s_{THRU,THRU} - \hat{s}_{ATN,THRU}}{\hat{s}_{ATN,ATN} - \hat{s}_{ATN,THRU}}.$$

When the first switching unit is switched to the optionally implementable switch position (i, j=LOAD), in the case of which the transmission path outgoing from the signal production unit and the receiving path incoming to the evaluation unit are each switched via a load resistance to ground, and when the first switching unit is supplementally switched to that switch position (i=THRU, j=LOAD), in the case of which the signal production unit is connected with the antenna arrangement (i=THRU) and the receiving path incoming to the evaluation unit is connected via a load resistance to ground (j=LOAD), the characteristic variable ($s_{THRU,THRU}$) ascertained in measurement operation can be even more exactly reconciled according to $$s'_{THRU,THRU} = \frac{s_{THRU,THRU} - \hat{s}_{THRU,LOAD}}{\hat{s}_{ATN,ATN} - \hat{s}_{LOAD,LOAD}}.$$

In order that the characteristic variable ($s_{THRU,THRU}$) ascertained in measurement operation for determining the measured variable can be corrected supplementally to the calibration method of the present disclosure also by means of a calibration, it is necessary that the first switching unit during ascertaining the corresponding characteristic variable ($s_{GND,GND}$) be switched to that switch position (i, j=GND), in the case of which the transmission path outgoing from the signal production unit and/or the receiving path incoming to the evaluation unit are/is switched to ground, wherein the antenna arrangement in the case of this switch position (i, j=GND) is separated from the signal production unit and/or from the evaluation unit.

Moreover for this, the first switching unit is switched, earlier or thereafter, to that switch position (i, j=OPEN), in the case of which the transmission path and/or the receiving path are/is interrupted (i, j=OPEN).

In such case, the corresponding characteristic variables ($s_{OPEN,OPEN}$, $s_{GND,GND}$) are ascertained at both of the switch positions (i, j=GND), (i, j=OPEN). In a variant thereof, the characteristic variable ($s_{THRU,THRU}$) ascertained in measurement operation can according to the present disclosure also be reconciled by means of a modified SOLT-calibration. For this, the calibration factors ($\hat{s}_{LOAD,LOAD}$; $\hat{s}_{THRU,LOAD}$; $\hat{s}_{LOAD,THRU}$), which are normally ascertained in the course of a SOLT calibration at the switch position i, j=LOAD, are within the scope of the present disclosure replaced by the calibration factors ($\hat{s}_{THRU,ATN}$; $\hat{s}_{ATN,THRU}$; $\hat{s}_{ATN,ATN}$) ascertained at the switch positions i=THRU; j=ATN, i=ATN; j=THRU, and i, j=ATN.

BRIEF DESCRIPTION OF THE DRAWINGS

The present disclosure will now be explained in greater detail based on the appended drawing. The figures of the drawing show as follows:

FIG. 3 shows a method for calibrating the field device of the present disclosure.

DETAILED DESCRIPTION

Figure 1:
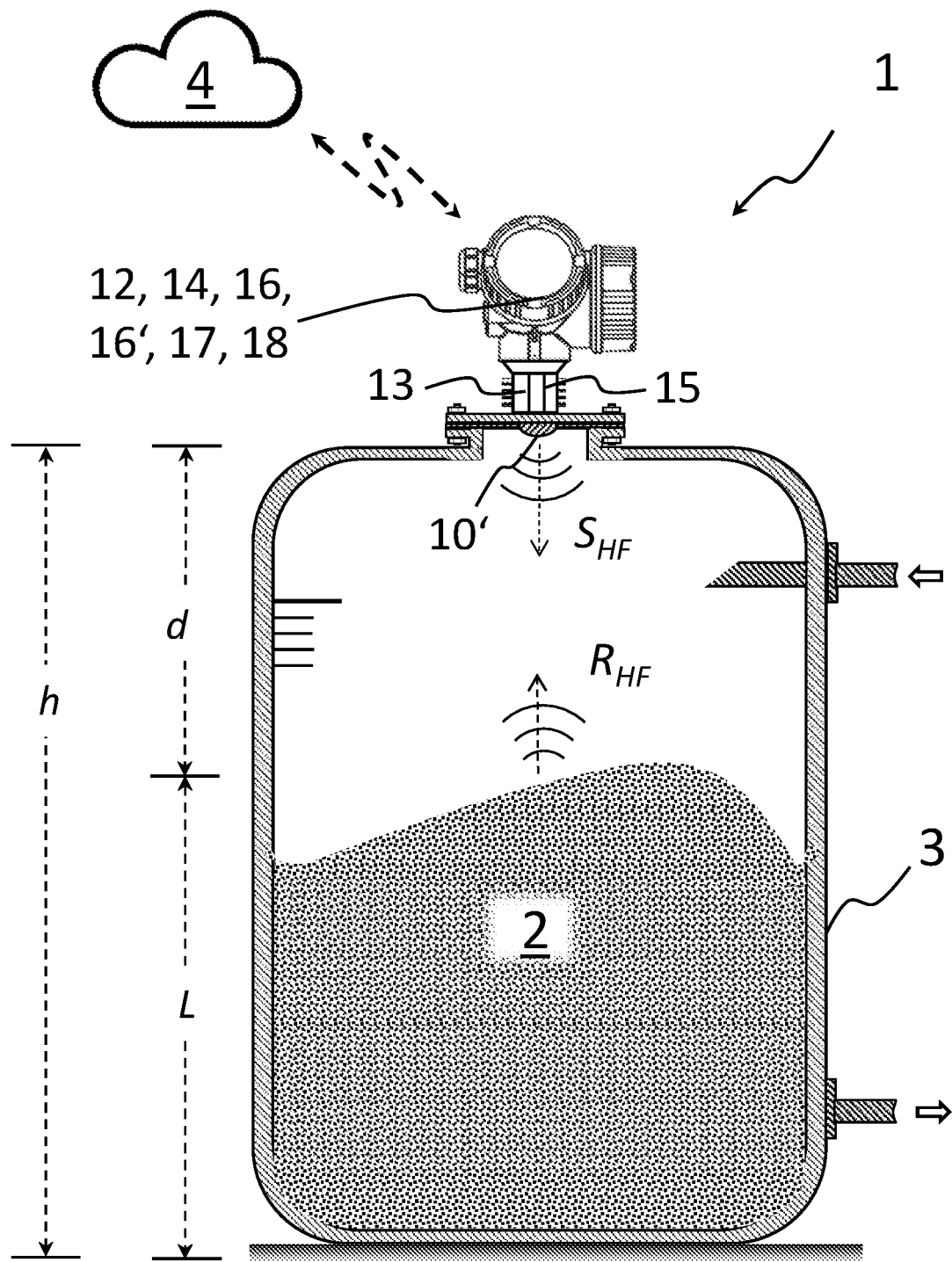
FIG. 1 shows a radar based, fill level measuring device on a container.
Figure 2:
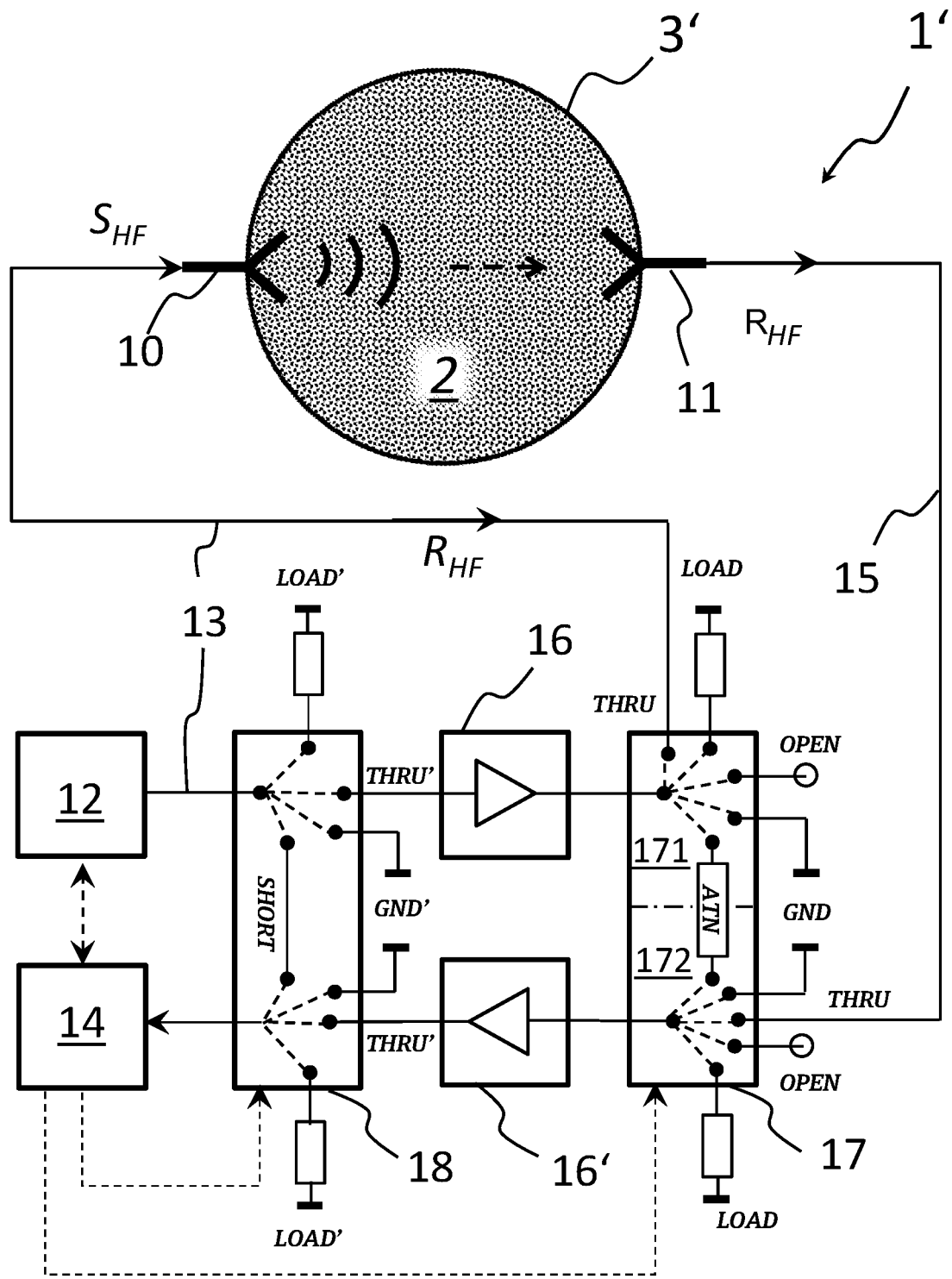
FIG. 2 shows a circuit diagram of the measuring device of the present disclosure using the example of transmissive dielectric value measurement.

The principles of the present disclosure for calibrating high frequency based field devices 1, 1' can be applied, for example, in the case of radar based fill level measurement or in the case of transmissive dielectric value measurement. For a general understanding of such high frequency based field devices 1, 1', FIG. 1 shows a radar based, fill level measuring device 1 on a container 3. FIG. 2 shows a transmissive dielectric value measuring device 1' at a pipeline section 3'.

FIG. 1 shows a medium 2 accommodated in a container 3, wherein the fill level L of the medium 2 is to be determined as measured variable. In such case, the medium 2 can be liquid, such as drinks, paints, cement or fuel, such as liquified gases, or mineral oil. Another option, however, is the application of the fill level measuring device 1 in the case of bulk good media 2, such as, for example, feed or food grain, or gravel. Depending on application and depending on type of medium 2, the container 3 can be even greater than 100 m tall. In order to be able to ascertain the fill level L, the fill level measuring device 1 is placed at a known, installed height h above the floor of the medium 2 at a corresponding opening on the container 3. As shown in FIG. 1, field devices 1, 1' are, as a rule, connected via an interface, for instance, PROFIBUS, HART or wireless HART, to a superordinated unit 4, such as e.g. a process control system or a decentral database. In this way, the ascertained measured variable L, DK can be transmitted, for example, in order, in given cases, to control in- and outflows of the container 3. However, also other information concerning general operating state of the field device 1, 1' can be communicated.

The fill level measuring device 1 is so oriented and secured on the container 3 that it can transmit high frequency signals $S_{HF}$ via a transmitting/receiving antenna 10', for instance, along a vertically directed axis in the direction of the surface of the fill substance 2. In such case, the high frequency signal $S_{HF}$ to be transmitted is produced by a signal production unit 12 of the fill level measuring device 1, for example, according to the FMCW—or according to the pulse travel time principle, and fed via a transmission path 13 and an adjoining transmitting/receiving separator (not shown) to the transmitting/receiving antenna 10' of the fill level measuring device 1.

After reflection on the fill substance surface, the reflected high frequency signals $R_{HF}$ are, in turn, received via the transmitting/receiving antenna 10' and fed via the transmitting/receiving-separator and an adjoining receiving path 15 to an evaluation unit 14 of the fill level measuring device 1. In such case, the signal travel time between the transmitting of the high frequency signal $S_{HF}$ and the receiving of the high frequency signal $R_{HF}$ reflected on the fill substance surface is proportional to the distance d between the fill level measuring device 1 and the medium 2. Since the evaluation unit 14 can ascertain, at least indirectly, the signal travel time as characteristic variable $s_{i,j}$ of the received signal $R_{HF}$ based on the FMCW—or pulse travel time principle, it is possible, for example, based on a corresponding calibration of the measured signal travel time, to match a particular distance d with any travel time. In this way, the evaluation unit 14 of the fill level measuring device 1 can determine the fill level L according to $$d = h - L$$

when the installed height h is furnished in the fill level measuring device 1.

FIG. 2 shows a sectional view of a pipeline section 3', wherein the pipeline section 3' is flowed through by a gaseous medium 2, such as propane, nitrogen, etc. or a liquid medium 2, such as fuel, drinks or waste waters with solid entrained material. To be determined as measured variable in the case of the embodiment of the present disclosure shown in FIG. 2 is the dielectric value DK of the medium 2. For this, arranged on the interior of the pipeline section 3 opposite to one another and oriented to face one another are a transmitting antenna 10 and a receiving antenna 11. Thus, there is formed between the resulting antenna arrangement 10, 11 a corresponding measurement path, along which the high frequency signal $S_{HF}$ travels through the medium 2.

Alternatively to the embodiment of the dielectric value measuring device 1' shown in FIG. 2, one of the antennas 10, 11 of the dielectric value measuring device 1' can also be designed as a combined transmitting/receiving antenna 10', while at the site of the other antenna 10, 11 a reflector for the high frequency signal $S_{HF}$, $R_{HF}$ is mounted. In such case, the transmitting/receiving antenna 10' is, analogously to the fill level measuring device 1 described in FIG. 1, in turn, connected with the transmission path 13, or the receiving path 15, via a transmitting/receiving separator. Since the dielectric value measuring device 1' shown in FIG. 2, in contrast to the fill level measuring device 1 shown in FIG. 1, does not use a combined transmitting/receiving antenna 10', no transmitting/receiving separator is required, in order to connect the signal production unit 12 of the dielectric value measuring device 1' via the transmission path 13 with the transmitting antenna 10 and to connect the evaluation unit 14 via the receiving path 15 with the receiving antenna 11.

In contrast with fill level measurement, the evaluation unit 14 of the dielectric value measuring device 1' shown in FIG. 2 ascertains as a measured variable $s_{i,j}$ the phase and/or the amplitude of the received signal $R_{HF}$, in order to determine therefrom the real value, complex value or magnitude of the dielectric value DK of the medium 2. In order that the phase, or amplitude, can also be ascertained relative to the transmitted high frequency signal $S_{HF}$, the evaluation unit 14 is, when required, correspondingly connected with the signal production unit 12, such as shown in FIG. 2. In such case, the signal production unit 12 can, analogously to the fill level measuring device 1 shown in FIG. 1, operate based, for example, on a phase locked loop (PLL).

It is clear from FIG. 2 that both transmissive working dielectric value measuring devices 1', as well as also radar based, fill level measuring devices 1, comprise, usually, at least one receiving amplifier 16', in order to compensate signal attenuation within the container 3, and within the medium 2. For this, the receiving amplifier 16' is arranged in the receiving path 15 between the receiving antenna 11 and the evaluation unit 14. In the case of the embodiment shown in FIG. 2, the dielectric value measuring device 1' comprises for the same purpose, moreover, a transmission amplifier 16, which is arranged in the transmission path 13 between the signal production unit 12 and the transmitting antenna 10.

Problematic with amplifiers 16, 16' in the transmission path 13 and in the receiving path 15 is, however, the possibility of couplings and frequency responses, which superimpose additively on the received signal $R_{HF}$ and, thus, on the characteristic variable $s_{i,j}$, and, thus, lastly corrupt the fill level value L or the dielectric value DK. Known calibration methods, such as the LMR16 method are, however, only conditionally suitable in this regard.

As is shown based on FIG. 2, the high frequency based field device 1, 1' of the present disclosure includes a first switching unit 17 for compensating possible couplings attributable to the amplifiers 16, 16'. In such case, the first switching unit 17 is composed of two switches 171, 172, which are actuatable independently of one another and which can be implemented, for example, as SP4T switches, each of which can be controlled by the evaluation unit 14: a first switch 171 is arranged in the transmission path 13 in signal direction of the high frequency signal $S_{HF}$ after the transmission amplifier 16 and before the transmitting antenna 10. The second switch 172 is arranged in the receiving path 15, in turn, in signal direction after the receiving antenna 11 and before the evaluation unit 14.

In such case, the compensation occurs by means of a calibration method, which is performed after construction of the device 1, 1' and before actual measurement operation. For this, the signal production unit 12 first produces the high frequency signal $S_{HF}$. In such case, corresponding characteristic variables $s_{i,j}$ are ascertained by the evaluation unit 14 at defined switch positions i, j=THRU, LOAD, OPEN, GND, ATN. In such case, the evaluation unit 14 can for the case, in which the dielectric value DK is to be determined, ascertain preferably the amplitude or phase of the received signal $R_{HF}$ as characteristic variable $s_{i,j}$ (in given cases, relative to the transmitted high frequency signal $S_{HF}$). In the case of the fill level L, especially the signal travel time of the high frequency signal $S_{HF}$, $R_{HF}$ is determined as characteristic variable $s_{i,j}$, for example, by means of the pulse travel time-principle or the FMCW principle.

In turn, the evaluation unit 14 defines the characteristic variables $s_{i,j}$ ascertained at the corresponding switch positions i, j=THRU, LOAD, OPEN, GND, ATN as calibration factors $s_{i,j}$. Then, the characteristic variables $s_{THRU,THRU}$ ascertained in later measurement operation, on the basis of which the measured variable L, DK is determined, are compensated by subtraction, or division, with the at least a first calibration factor $\hat{s}_{i,j}$.

As shown in FIG. 2, the two switches 171, 172 can for determining the measured variable L, DK, and for determining the first calibration factor $\hat{s}_{i,j}$, in each case, assume five different switch positions i, j=THRU, LOAD, OPEN, GND and ATN, independently of one another:

In the basic switch position i, j=THRU, the first switch 171 is so set that the signal production unit 12 is connected with the transmitting antenna 10 of the antenna arrangement 10, 11, while the second switch 172 connects the evaluation unit 14 with the receiving antenna 11. In this switch position THRU, in which the two switches 171, 172 are switched to THRU, the actual fill level-, or dielectric value measurements can be performed during measurement operation. The means that the high frequency signal $S_{HF}$ produced by the signal production unit 12 is fed via the transmission path 13, via the antennas 10, 11 (thus, through the medium 2) and then via the receiving path 15 to the evaluation unit 14, in order to ascertain from the received high frequency signal $R_{HF}$ the particular characteristic variable $s_{THRU,THRU}$, and in order to determine therefrom—after reconciliation of the characteristic variable $s_{THRU,THRU}$ with the calibration factor $\hat{s}_{i,j}$—, in turn, the measured variable DK, L. Alternatively, when, for example, only one of the switches 171, 172 is switched to THRU, then, based on the corresponding characteristic variable $s_{i,THRU}$, $s_{THRU,j}$, in turn, the corresponding first calibration factor $\hat{s}_{THRU,THRU}$, $\hat{s}_{THRU,j}$, $\hat{s}_{i,THRU}$ can be defined.

In the switch position i, j=ATN, which is essential for performing the calibration method of the present disclosure, the transmission path 13 is switched via the first switch 171 to an attenuation element. The opposite contact of the attenuation element can be switched by the second switch 172 in the case of this switch position ATN to the receiving path 15. The antenna arrangement 10, 11 is in the case of this switch position ATN electrically isolated from the signal production unit 12, and from the evaluation unit 14. In this way, the evaluation unit 14 is connected via the switches 171, 172 and the amplifiers 16, 16' with the signal production unit 12, when the two switches 171, 172 are in this switch position i, j=ATN.

In this way, the switch position i, j=ATN completes a reference path of the high frequency signal $S_{HF}$, $R_{HF}$ between the signal production unit 12 and the evaluation unit 14, which does not lead over the measurement path and through the medium 2. In such case, the value of the attenuation element is preferably so selected that the resulting amplification factor of the amplifiers 16, 16' is compensated at the evaluation unit 14. In the present case, this corresponds to an attenuation of about 60 dB. For this, the attenuation element can be implemented by means of corresponding resistances and capacitances, or as a PI controller. This switch position i, j=ATN is used in the context of the calibration of the present disclosure: In such case, the high frequency signal $S_{HF}$ produced in the course of the calibration method is fed via the correspondingly shortened signal-path 13, 15 to the evaluation unit 14, in order in this switch position i, j=ATN to ascertain from the received high frequency signal $R_{HF}$ the corresponding characteristic variable $s_{ATN,ATN}$. When only one of the switches 171, 172 is switched, i.e. i=ATN; j=THRU or i=THRU; j=ATN, possible coupling paths, which result layout-dependently between the transmission path 13 and the receiving path 15, can be compensated.

An optional switch position i, j=OPEN of the switching unit 17 enables that the first transmission path 13 is interrupted by the first switch 171, and/or that the receiving path 15 is interrupted by the second switch 172. In this way, a reflecting termination is formed for the high frequency signal $S_{HF}$, $R_{HF}$. Also this switch position i,j=OPEN can be utilized in the context of the calibration method, in order in the case of this switch position i,j=OPEN to ascertain from the resulting signal $R_{HF}$ received at the evaluation unit 14 the corresponding characteristic variable $s_{OPEN,j}$, $s_{i,OPEN}$, $s_{OPEN,OPEN}$, in each case, as a first calibration factor $\hat{s}_{i,j}$.

In contrast with the open switch position i, j=OPEN, the first transmission path 13 can be drawn to a ground potential by the first switch 171 in an additional, optional switch position i, j=GND; this switch position i, j=GND can also be set at the second switch 172, whereby the receiving path 15 leading to the evaluation unit 14 is drawn by the second switch 172, in turn, to the ground potential. In this way, a termination is formed, which reflects the high frequency signal $S_{HF}$, $R_{HF}$ with a phase rotation of 180°. This switch position i, j=GND can be utilized, in turn, in the context of the calibration method, according to which the produced high frequency signal $S_{HF}$ is led to ground and/or the evaluation unit 14 in this switch position i, j=GND ascertains the corresponding characteristic variable $S_{GND,j}$, $S_{i,GND}$, $s_{GND,GND}$ in the case of grounded receiving path 15 and, in given cases, uses such as first calibration factors $\hat{s}_{i,j}$.

Analogously to the switch position i, j=GND, in an optional, additional switch position i, j=LOAD, the first transmission path 13 is drawn by the first switch 171 to ground potential not directly, but, instead, via a load resistance. This switch position i, j=LOAD can also be set at the second switch 172, whereby the receiving path 15 incoming to the evaluation unit 14 from the second switch 172 is, in turn, drawn to ground via a load resistance. As a result of this switch position i, j=LOAD, a reflection free termination is formed for the high frequency signal $S_{HF}$, $R_{HF}$. Within the calibration method, also this switch position i, j=LOAD can be utilized, in order to determine the corresponding characteristic variables $s_{LOAD,j}$, $s_{i,LOAD}$, $s_{LOAD,LOAD}$ as calibration factors $\hat{s}_{i,j}$. In combination with the switch positions i, j=GND and i, j=OPEN, the evaluation unit 14 can perform by means of this switch position i, j=LOAD a calibration known as SOLT (SHORT, OPEN, LOAD, THRU) according to the state of the art.

Due to the switch position i, j=ATN of the present disclosure, it is, however, also possible to modify the SOL-calibration, in that the first calibration factors ($\hat{s}_{LOAD,LOAD}$; $\hat{s}_{THRU,LOAD}$, $\hat{s}_{LOAD,THRU}$) of the SOL-calibration, which are usually ascertained at the switch position i, j=LOAD, are replaced by first calibration factors ($\hat{s}_{THRU,ATN}$; $\hat{s}_{ATN,THRU}$, $\hat{s}_{ATN,ATN}$), which are ascertained at switch positions i=THRU, j=ATN; i=ATN; j=THRU, and i, j=ATN. In such case, the characteristic variable $s_{THRU,THRU}$ ascertained in the measurement operation following thereon can be reconciled using the correspondingly modified SOL-calibration. Advantageous here is that no load resistances, or switch position i, j=LOAD, are required. By means of the (modified) SOL-calibration, it is possible to compensate errors, which are caused by reflection of the high frequency signal $S_{HF}$, $R_{HF}$ between the first switching unit 17 and the signal production unit 12, or the evaluation unit 14. However, no couplings between the amplifiers 16, 16' superimposed additively on the received signal $R_{HF}$ can be compensated by means of the SOL-calibration.

A variant of the calibration method of the present disclosure, by means of which also these influence variables can be compensated, will now be explained in greater detail based on FIG. 3. The heart of the calibration method of the present disclosure lies, in such case, with the method steps 6 and 7, in which, in each case, corresponding first calibration factors $\hat{s}_{ATN,ATN}$, $\hat{s}_{ATN,THRU}$, $\hat{s}_{THRU,ATN}$ are determined: In method step 6, both the first switch 171, as well as also the second switch 172, are switched to the switch position i, j=ATN. In this switch position i, j=ATN, the evaluation unit 14 determines the corresponding characteristic variable $s_{ATN,ATN}$. For this, the signal production unit 12 generates the high frequency signal $S_{HF}$ at least during this time. The registered characteristic variable $s_{ATN,ATN}$ is stored as a first calibration factor $\hat{s}_{ATN,ATN}$.

In the following method step 7, the evaluation unit 14 moves the first switch 171 to the switch position i=THRU, while the second switch 172 remains in the switch position j=ATN. Also in the case of this switch position i=THRU, j=ATN, while the high frequency signal $S_{HF}$ is being produced, the corresponding characteristic variable $s_{THRU,ATN}$ is registered and stored as a first calibration factor $\hat{s}_{THRU,ATN}$. In this way, the in the later measurement operation ascertained characteristic variable $s_{THRU,THRU}$, which serves for determining the measured variable L, DK, can, in each case, be reconciled according to $$s'_{THRU,THRU} = \frac{s_{THRU,THRU} - \hat{s}_{THRU,ATN}}{\hat{s}_{ATN,ATN} - \hat{s}_{THRU,ATN}}.$$

Alternatively in method step 7, it is also possible to change not the first switch 171 to the switch position i=THRU, but, instead, the second switch 172 j=THRU, while the first switch 171 remains at the switch position i=ATN. In such case, the evaluation unit 14 can in regular measurement operation for determining the measured variable L, DK ascertain the characteristic variable $s_{THRU,THRU}$ and compensate it according to $$s'_{THRU,THRU} = \frac{s_{THRU,THRU} - \hat{s}_{ATN,THRU}}{\hat{s}_{ATN,ATN} - \hat{s}_{ATN,THRU}}.$$

When load resistances are introduced in the first switching unit 17 via the switch position i,j=LOAD, the second switch 172 in method step 7 can in a third variant be set to the switch position j=LOAD, while the first switch 171 remains at the switch position i=THRU. The then ascertained characteristic variable $s_{THRU,LOAD}$ can, in turn, be stored as a first calibration factor $\hat{s}_{THRU,LOAD}$. In the case of this variant, for compensating the amplifiers 16, 16', it is, however, supplementally necessary, besides performing the method steps 6 and 7, to switch the two switches 171, 172 of the first switching unit 17 to the switch position i, j=LOAD in an additional method step (one of the method steps 1 to 5 in FIG. 3), in order to ascertain the corresponding characteristic variable $s_{LOAD,LOAD}$, and the corresponding first calibration factor $\hat{s}_{LOAD,LOAD}$. In such case, the characteristic variable $s_{THRU,THRU}$ relevant for determining the measured variable L, DK can be determined in measurement operation, in each case, according to $$s'_{THRU,THRU} = \frac{s_{THRU,THRU} - \hat{s}_{THRU,LOAD}}{\hat{s}_{ATN,ATN} - \hat{s}_{LOAD,LOAD}}.$$

From the above formulas for determining the reconciled characteristic variable $s'_{THRU,THRU}$, it becomes clear in general that within the scope of the present disclosure it is not important in which sequence the method steps 1-5, or 6 and 7 are performed.

As can be seen from FIGS. 2 and 3, the calibration method of the present disclosure, and the first switch arrangement 17, can be supplemented with a known calibration method, such as the LMR16—or SOLT methods, in order to be able to reconcile the particular measured variable L, DK even more exactly. As can be seen from FIG. 2, the dielectric value measuring device 1' illustrated there, consequently includes, supplementally, a second switching unit 18. Such is arranged in the transmission path 13 between the transmitting unit 12 and the transmission amplifier 16, and in the receiving path 15 between the receiving amplifier 16' and the evaluation unit 14. In such case, the second switching unit 18 can assume switch positions similar to the first switching unit 17:

THRU'
SHORT
LOAD'
GND'.

Except for switch position i, j=SHORT, these switch positions i, j=THRU', SHORT, LOAD', GND' correspond to the switch positions i, j=THRU, ATN, LOAD, GND of the first switching unit 17: In contrast with the switch position ATN of the first switching unit 17, there is no attenuation element in the second switching unit 18 at the switch position i, j=SHORT between the transmission path 13 and the receiving path 15, so that the circuits are shorted. In such case, also the second switching unit 18 is controlled by the evaluation unit 14. It is true that no influences of the amplifiers 16, 16' can be compensated by means of the second switching unit 18. However, it is possible to apply the LMR16 method, such as corresponds to the method steps 1 to 5 in FIG. 3, in order to derive therefrom corresponding, second calibration factors $\hat{s}_{i,j}'$. In such case, it is possible to reconcile the characteristic variable $s_{THRU,THRU}$ ascertained in measurement operation not only by means of the first calibration factors $\hat{s}_{i,j}$, but, instead, supplementally also by means of the second calibration factors $\hat{s}_{i,j}'$. By supplementing the calibration method of the present disclosure with the LMR16 method, there results accordingly the synergistic effect that all circuit components 12, 13, 14, 15, 16, 16', 17, 18 of the field device 1, 1' become properly reconciled.

The invention claimed is:

1. A high frequency based field device for determining a measured variable of a medium, comprising:
an antenna arrangement placeable on a container for transmitting a high frequency signal to the medium and after interaction with the medium saving a received signal;
a signal production unit designed to produce the high frequency signal to be transmitted and to supply the high frequency signal via a transmission path to the antenna arrangement;

an evaluation unit connected via a receiving path with the antenna arrangement to determine a defined characteristic variable at least based on the incoming, received signal;
a transmission amplifier arranged in the transmission path and/or a receiving amplifier arranged in the receiving path; and
a first switching unit arranged between the antenna arrangement and the transmission amplifier in the transmission path and the receiving amplifier in the receiving path, wherein the first switching unit is designed to assume such switch positions that the signal production unit and/or the evaluation unit are/is connected, in each case, with the antenna arrangement (i, j=THRU), and the transmission path and/or the receiving path are/is connected to an attenuation element via which the transmission path is connectable with the receiving path (i, j=ATN), wherein the antenna arrangement in the case of this switch position (i, j=ATN) is separated from the signal production unit and/or from the evaluation unit,
wherein the evaluation unit is designed to set the switch position of the first switching unit to determine at the set switch position the corresponding characteristic variable ($s_{i,j}$) as a first calibration factor ($\hat{s}_{i,j}$), to reconcile a characteristic variable ($s_{THRU,THRU}$) ascertained in measurement operation via the first calibration factor ($\hat{s}_{i,j}$), and to determine the measured variable of the medium based on the reconciled characteristic variable ($s'_{THRU,THRU}$).

2. The field device as claimed in claim 1, wherein the evaluation unit is designed to determine as defined characteristic variable ($s_{i,j}$) of the received signal a phase, or phase shift, and/or an amplitude.

3. The field device as claimed in claim 1, wherein the measured variable is a fill level or a dielectric value or a measured variable derivable therefrom.

4. The field device as claimed in claim 1, wherein the antenna arrangement includes a transmitting antenna for transmitting the high frequency signal and a receiving antenna for receiving the high frequency signal after its having passed through the medium, or
wherein the antenna arrangement includes a combined transmitting/receiving antenna for transmitting and/or receiving the high frequency signal.

5. The field device as claimed in claim 1, wherein the attenuation element is sized such that the produced high frequency signal in signal direction behind the transmission amplifier or before the receiving amplifier experiences an attenuation that corresponds to an amplification factor of the transmission amplifier and/or the receiving amplifier.

6. The field device as claimed in claim 1, wherein the first switching unit is further designed to assume a switch position (i, j=LOAD) such that the transmission path outgoing from the signal production unit and/or the receiving path incoming to the evaluation unit, in each case, are/is connected via a load resistance to ground.

7. The field device as claimed in claim 6, wherein the first switching unit is further designed to assume a switch position (i, j=GND) such that the transmission path outgoing from the signal production unit and/or the receiving path incoming to the evaluation unit are/is connected to ground, wherein the antenna arrangement in the case of this switch position (i, j=GND) is separated from the signal production unit and/or from the evaluation unit.

8. The field device as claimed in claim 7, wherein the first switching unit is further designed to assume a switch position (i, j=OPEN) such that the transmission path and/or the receiving path are/is interrupted.

9. A method for calibrating a field device, the method comprising:
providing the field device, including:
an antenna arrangement placeable on a container for transmitting a high frequency signal to the medium and after interaction with the medium saving a received signal;
a signal production unit designed to produce the high frequency signal to be transmitted and to supply the high frequency signal via a transmission path to the antenna arrangement;
an evaluation unit connected via a receiving path with the antenna arrangement to determine a defined characteristic variable at least based on the incoming, received signal;
a transmission amplifier arranged in the transmission path and/or a receiving amplifier arranged in the receiving path; and
a first switching unit arranged between the antenna arrangement and the transmission amplifier in the transmission path and the receiving amplifier in the receiving path, wherein the first switching unit is designed to assume such switch positions that the signal production unit and/or the evaluation unit are/is connected, in each case, with the antenna arrangement (i, j=THRU), and the transmission path and/or the receiving path are/is connected to an attenuation element via which the transmission path is connectable with the receiving path (i, j=ATN), wherein the antenna arrangement in the case of this switch position (i, j=ATN) is separated from the signal production unit and/or from the evaluation unit,
wherein the evaluation unit is designed to set the switch position of the first switching unit to determine at the set switch position the corresponding characteristic variable ($s_{i,j}$) as a first calibration factor ($\hat{s}_{i,j}$), to reconcile a characteristic variable ($s_{THRU,THRU}$) ascertained in measurement operation via the first calibration factor ($\hat{s}_{i,j}$), and to determine the measured variable of the medium based on the reconciled characteristic variable ($s'_{THRU,THRU}$);
switching the first switching unit to that switch position (i, j=ATN) at which the transmission path is connected via the attenuation element with the receiving path and the antenna arrangement is separated from the signal production unit and/or from the evaluation unit;
ascertaining the characteristic variable ($s_{i,j}$) based on the received signal at the current switch position; and
determining the at least one ascertained characteristic variable ($s_{i,j}$) as a first calibration factor ($\hat{s}_{i,j}$).

10. The method as claimed in claim 9, wherein the first switching unit is switched to that switch position (i=THRU, j=ATN) in the case of which the signal production unit is connected with the antenna arrangement (i=THRU) and the receiving path is connected to the attenuation element (j=ATN), and/or
wherein the first switching unit is connected to that switch position (i=ATN, j=THRU) in the case of which the transmission path is connected to the attenuation element (i=ATN) and the evaluation unit is connected with the antenna arrangement (j=THRU).

11. The method as claimed in claim 10, further comprising:

reconciling the characteristic variable ($s_{THRU,THRU}$) ascertained in measurement operation according to $$s'_{THRU,THRU} = \frac{s_{THRU,THRU} - \hat{s}_{THRU,ATN}}{\hat{s}_{ATN,ATN} - \hat{s}_{THRU,ATN}}$$

and/or according to $$s'_{THRU,THRU} = \frac{s_{THRU,THRU} - \hat{s}_{ATN,THRU}}{\hat{s}_{ATN,ATN} - \hat{s}_{ATN,THRU}}.$$

12. The method as claimed in claim 10, further comprising:
switching the first switching unit to that switch position (i, j=GND) in the case of which the transmission path outgoing from the signal production unit and/or the receiving path incoming to the evaluation unit are/is switched to ground, wherein the antenna arrangement in the case of this switch position (i, j=GND) is separated from the signal production unit and/or from the evaluation unit;
switching the first switching unit to that switch position (i, j=OPEN) in the case of which the transmission path and/or the receiving path are/is interrupted (i, j=OPEN); and
reconciling the characteristic variable ($s_{THRU,THRU}$) ascertained in measurement operation corresponding to an SOL-calibration, or reconciling the characteristic variable ($s_{THRU,THRU}$) ascertained in measurement operation corresponding to a modified SOL-calibration such that the regular calibration factors ($\hat{s}_{LOAD,LOAD}$; $\hat{s}_{THRU,LOAD}$; $\hat{s}_{LOAD,THRU}$) ascertained at the switch position i, j=LOAD are replaced by the calibration factors ($\hat{s}_{,THRU,ATN}$; $\hat{s}_{ATN,THRU}$; $\hat{s}_{ATN,ATN}$) which are ascertained at the switch positions i=THRU; j=ATN and i=ATN j=THRU, or i, j=ATN.

13. The method as claimed in claim 9, further comprising:
switching the first switching unit to that switch position (i, j=LOAD) in the case of which the transmission path outgoing from the signal production unit and the receiving path incoming to the evaluation unit are each connected via a load resistance to ground;
switching the first switching unit to that switch position (i=THRU, j=LOAD) in the case of which the signal production unit is connected with the antenna arrangement (i=THRU) and the receiving path incoming to the evaluation unit is connected via a load resistance to ground (j=LOAD); and
reconciling the characteristic variable ($s_{THRU,THRU}$) ascertained in measurement operation according to $$s'_{THRU,THRU} = \frac{s_{THRU,THRU} - \hat{s}_{THRU,LOAD}}{\hat{s}_{ATN,ATN} - \hat{s}_{LOAD,LOAD}}.$$

* * * * *